United States Patent [19]
Kiser

[11] Patent Number: 5,690,345
[45] Date of Patent: Nov. 25, 1997

[54] BICYCLE PEDAL THAT MOVES IN A RECTILINEAR PATH

[76] Inventor: David Kerry Kiser, 513 E. Hearne Way, Gilbert, Ariz. 85234

[21] Appl. No.: 538,336

[22] Filed: Oct. 3, 1995

[51] Int. Cl.$^6$ ........................................... B62M 1/00
[52] U.S. Cl. ...................... 280/210; 280/257; 280/252; 474/160
[58] Field of Search .................... 280/210, 241, 280/252, 253, 251, 258, 259, 261, 236, 257; 474/51, 57, 58, 70, 160, 158, 84, 152, 153, 155

[56] References Cited

U.S. PATENT DOCUMENTS

| | | | |
|---|---|---|---|
| 3,820,820 | 6/1974 | Kutz | 280/261 X |
| 4,169,609 | 10/1979 | Zampedro | 280/252 X |
| 4,281,845 | 8/1981 | Brown | 280/236 |
| 5,104,137 | 4/1992 | Kilts | 280/253 X |
| 5,156,412 | 10/1992 | Meguerditchian | 280/252 X |
| 5,540,111 | 7/1996 | Barnett et al. | 280/252 X |

*Primary Examiner*—Victor E. Johnson
*Attorney, Agent, or Firm*—Blakely Sokoloff Taylor & Zafman

[57] ABSTRACT

A rectilinear drive assembly for a bicycle. The drive assembly includes a pair of tracks that each have a pair of opposing side portions joined by a pair of opposing radial end portions which together define a rectilinear path. The drive assembly also has a pair of pedals that are coupled to the track by a pair of wheel assemblies. The wheel assemblies follow the outline of the tracks so that the pedals move in a rectilinear path. The linear movement of the pedal provides a more efficient transfer of power from the rider's legs to the drive assembly. Each wheel assembly has a pair of inner wheels that roll along an inner surface of the track and a pair of outer wheels that roll along an outer surface of the track. The outer wheels are separated by a distance greater than the separation of the inner wheels to compensate for the different radiuses of the inner and outer surfaces at the radial end portions of the track. The wheel assemblies are connected to chains which rotate a number of sprockets. The sprockets are coupled to the rear wheel of the bicycle. The rectilinear path of the track provides an automatic return path for the rider during each pedal cycle.

17 Claims, 4 Drawing Sheets

BICYCLE PEDAL THAT MOVES IN A RECTILINEAR PATH

BACKGROUND OF THE INVENTION

1. Field of the Invention

The present invention relates to a pedal chain/sprocket drive assembly for a bicycle.

2. Description of Related Art

Bicycles typically have a chain drive assembly that is coupled to a pair of pedals and the rear wheel of the bike. The pedals are driven by the rider to impart a rotational movement of the chain drive assembly and the rear wheel. The pedals are typically driven in a circular path by the user. To obtain the maximum amount of torque on the chain drive it is desirable to provide a driving force that is perpendicular to the effective lever arm of the bike. As the pedal moves about the circular path of the drive assembly, the angle of the force vector required for maximum torque continually varies. The rider is located in a relatively fixed position and is unable to continuously vary the position of his foot to provide the maximum torque on the drive assembly.

U.S. Pat. No. 3,820,820 issued to Kutz; U.S. Pat. No. 4,173,154 issued to Sawmiller et al.; U.S. Pat. No. 4,564,206 issued to Lenhardt; and U.S. Pat. No. 5,156,412 issued to Meguerditchian, all disclose bicycles with pedal assemblies that move in a linear path. The linear pedal movement maintains an essentially parallel relationship between the rider's tibia and the linear power stroke path, to thereby more efficiently transfer power from the rider's legs to the drive assembly. The rectilinear drive assemblies of the prior art typically have a number of linkage arms which increase the cost of producing the bicycle. It would be desirable to provide a linear pedal drive assembly that is easy to use, efficiently transfers power from the rider to the drive assembly and is relatively inexpensive to produce.

SUMMARY OF THE INVENTION

The present invention is a rectilinear drive assembly for a bicycle. The drive assembly includes a pair of tracks that each have a pair of opposing side portions joined by a pair of opposing radial end portions which together define a rectilinear path. The drive assembly also has a pair of pedals that are coupled to the track by a pair of wheel assemblies. The wheel assemblies follow the outline of the tracks so that the pedals move in a rectilinear path. The linear movement of the pedal provides a more efficient transfer of power from the rider's legs to the drive assembly. Each wheel assembly has a pair of inner wheels that roll along an inner surface of the track and a pair of outer wheels that roll along an outer surface of the track. The outer wheels are separated by a distance greater than the separation of the inner wheels to compensate for the different radiuses of the inner and outer surfaces at the radial end portions of the track. The wheel assemblies are connected to chains which rotate a number of sprockets. The sprockets are coupled to the rear wheel of the bicycle.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
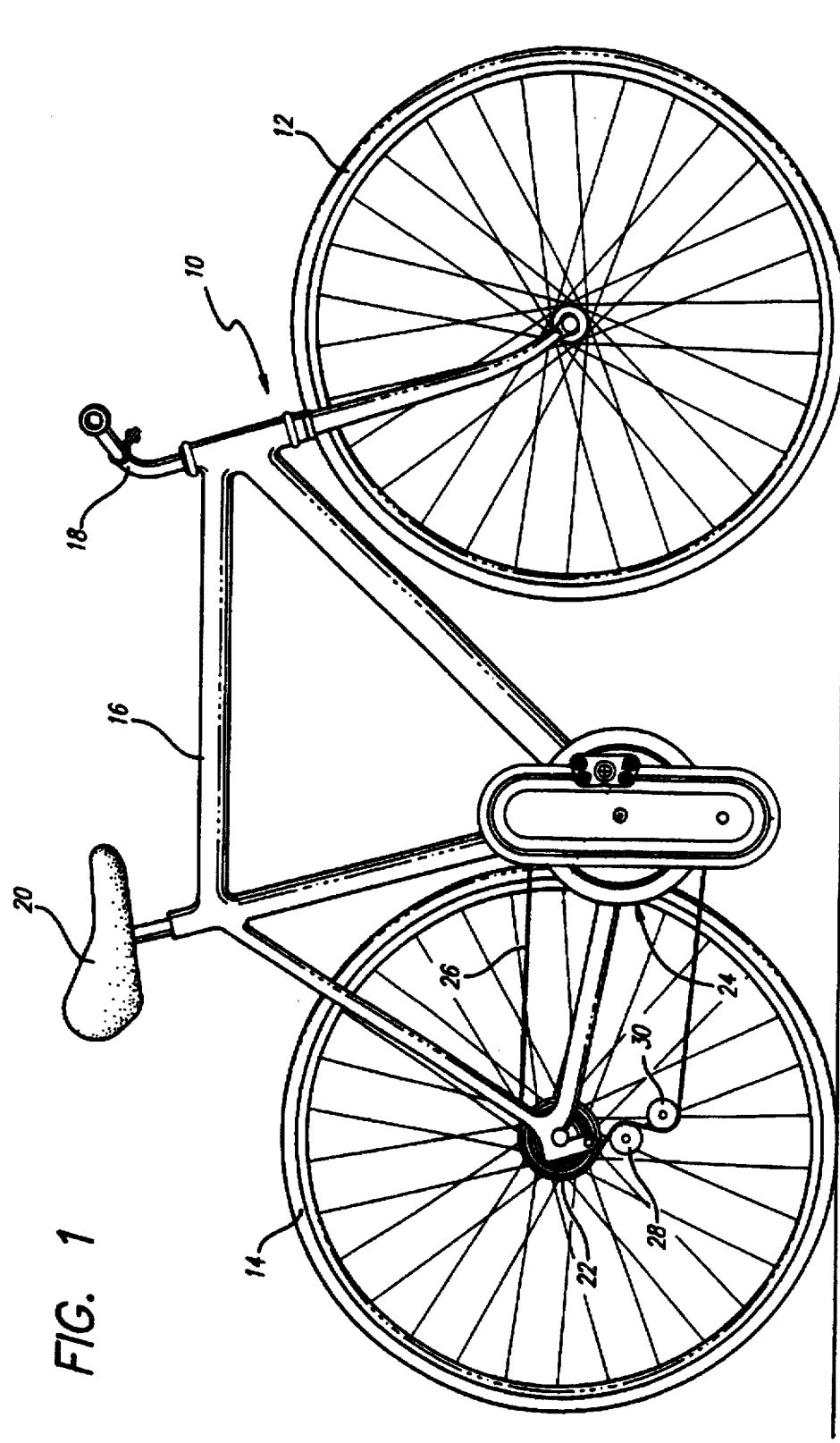
FIG. 1 is a side view of a bicycle of the present invention.

Referring to the drawings more particularly by reference numbers, FIG. 1 shows a bicycle 10 of the present invention. The bicycle 10 includes a front wheel 12 and a rear wheel 14 that are pivotally connected to a frame 16. The bike 10 also has a handle bar 18 and a seat 20 that are mounted to the frame 16. The rear wheel 14 has a drive sprocket 22 that is coupled to a pedal drive assembly 24 by a chain 26. The chain 26 can be tensioned by a pair of idler sprockets 28 and 30. The rear wheel 14 may have a plurality of sprockets and a deraillers (not shown) which provide a number of gears for the bicycle 10.

Figure 2:
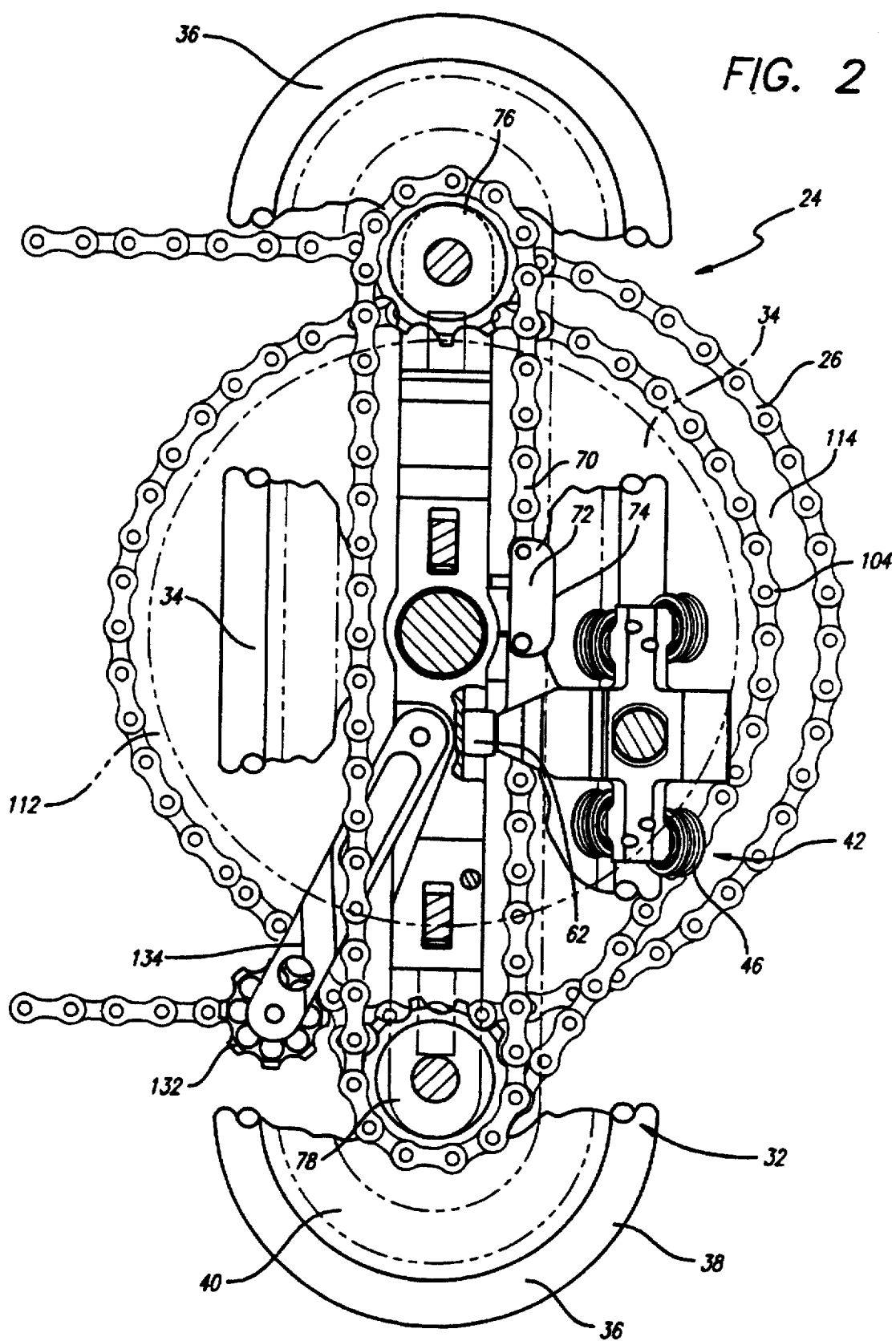
FIG. 2 is an enlarged side view of a pedal drive assembly of the bicycle.
Figure 3:
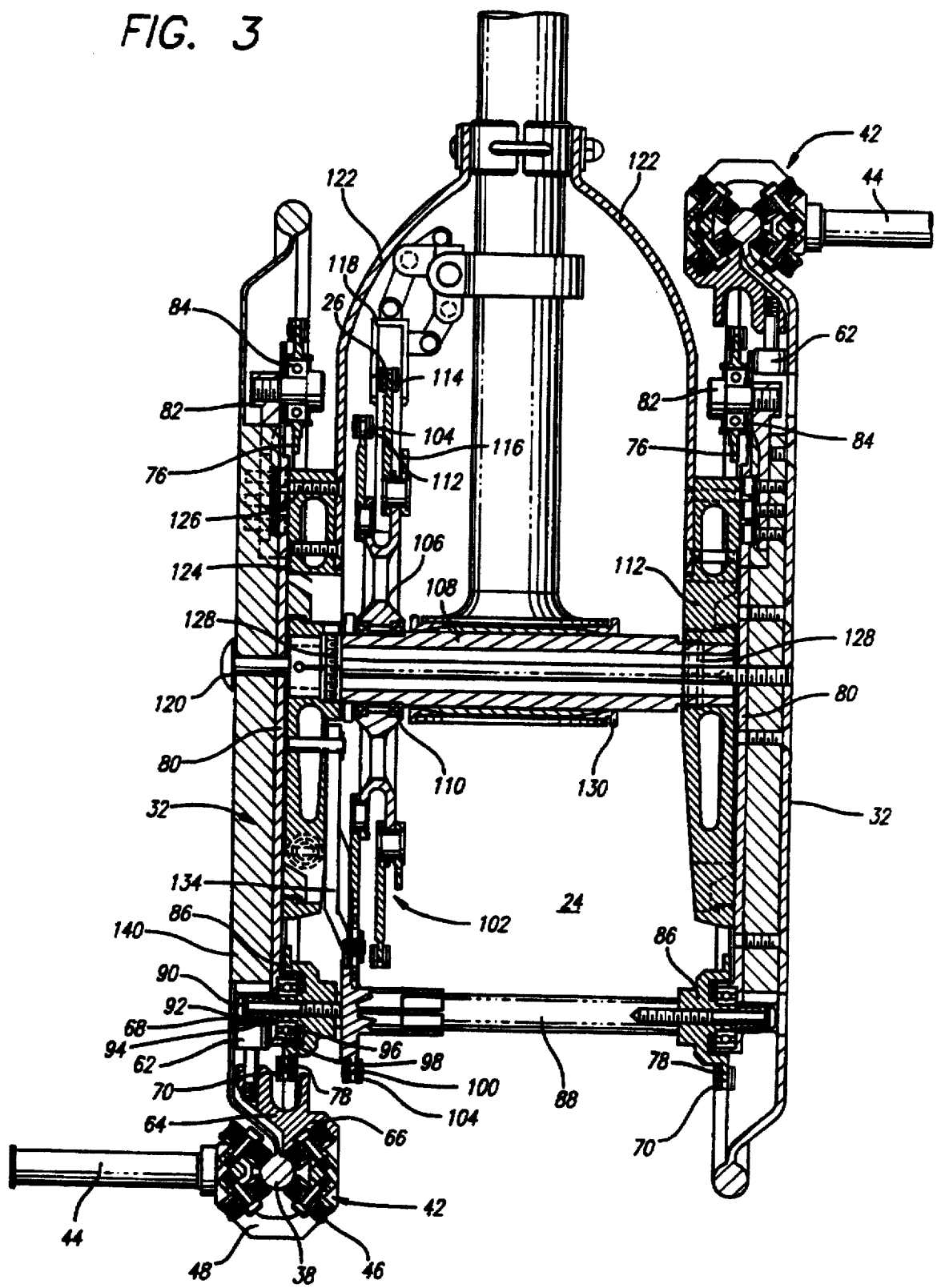
FIG. 3 is a cross-sectional front view of the pedal drive assembly.
Figure 4:
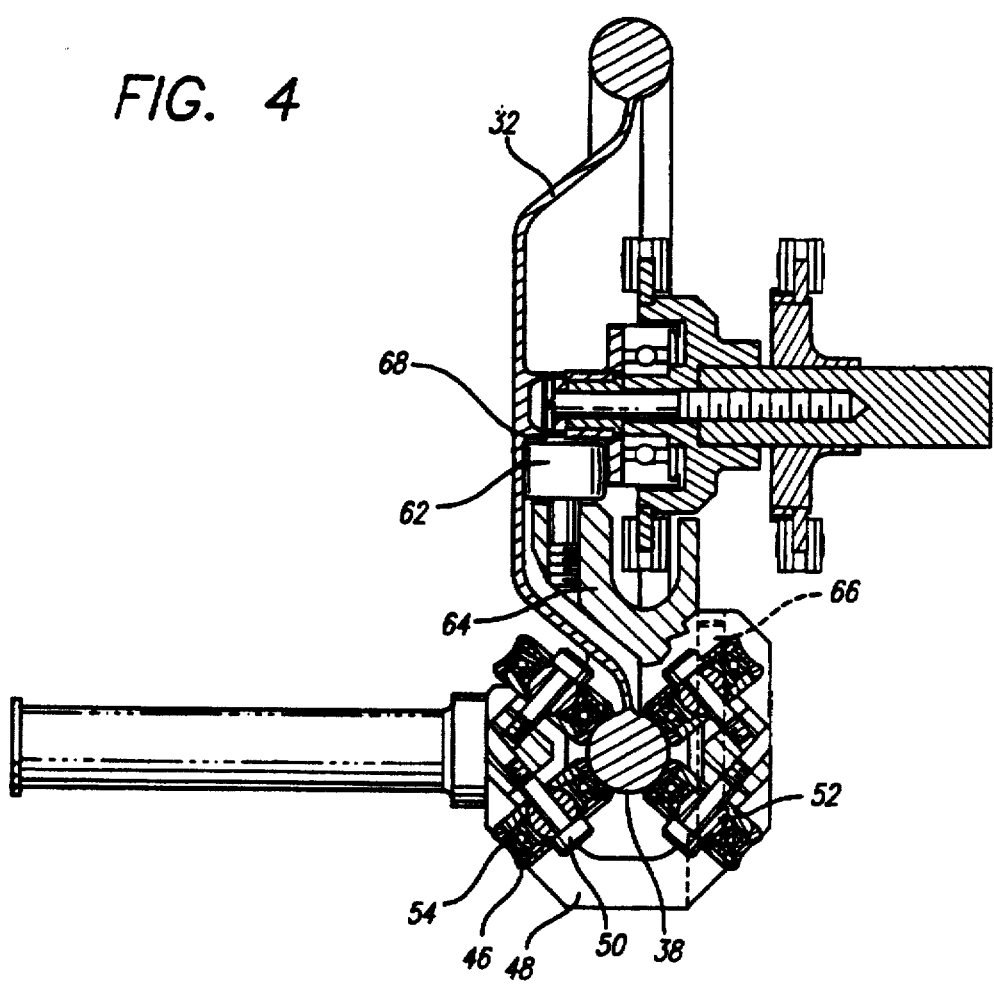
FIG. 4 is an enlarged cross-sectional top view of a wheel assembly.

As shown in FIGS. 2-4, the pedal drive assembly 24 includes a pair of tracks 32. Each track 32 has a pair of opposing side portions 34 and a pair of adjoining radial end portions 36 which together define a rectilinear path. The end and side portions are formed by an outer rim 38 that extends from a center hub portion 40 of the track 32. The rims 38 of each track 32 support a wheel assembly 42. Each wheel assembly 42 is connected to a pedal 44 which can be driven by the rider of the bike 10. As the rider peddles the bike 10, the wheel assembly 42 moves about the track 32 in the rectilinear path defined by the outer rim 38. When the wheel assembly 42 is moving along the linear side portions 34 of the track 32, the tibia of the rider is relatively parallel to the linear power stroke path of the bike 10. The parallel relationship optimizes the amount of force that is transferred to the drive assembly 24. In the preferred embodiment, the linear portions 34 of the track 32 are each approximately 9.1 to 10.7 inches and the radial portions 36 each have a radius of approximately 2.4 inches.

Referring to FIG. 4, each wheel assembly 42 includes a plurality of wheels 46 that are coupled to a shuttle 48 by a plurality of bolts 50. Each wheel 46 is coupled to a bolt 50 by a spherical bearing 52 and a ball bearing 54. The ball bearings 54 allow the wheel 46 to rotate relative to the rim 38 about the longitudinal axis of the bolt 50. The spherical bearings 52 allow relative movement between the wheel 46 and the rim 38 so that the wheel assembly 42 can move about the radial end portions 36 of the track 32. The wheels 46 have a concave contact surface 56 that conforms to the circular cross-section of the outer rim 38. The wheels 46 are preferably constructed from a low friction material such as the plastic sold under the trademark DELRIN.

Figure 5:
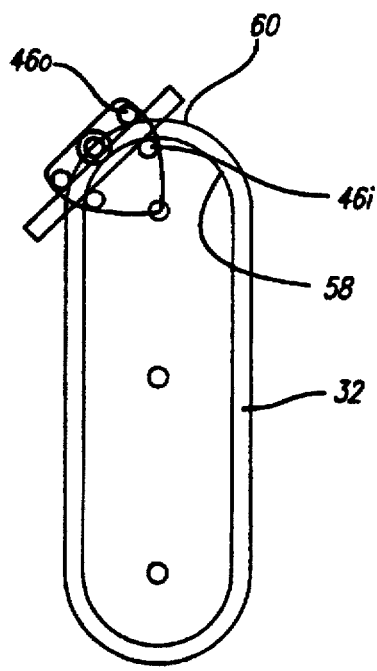
FIG. 5 is a schematic showing a wheel assembly moving about a track.

As shown in FIG. 5, the inner wheels 46i are separated by a distance that is less than the separation distance of the outer wheels 46o to compensate for the different radiuses of the inner 58 and outer 60 surfaces of the rim 38. The separation of the wheels 46 is preferably such that the contact surfaces of each wheel 46 remain in contact with the rim 38 across the entire radial end portions 36 of the track 32. The spherical bearings 52 will provide some compensation for any dimensional discrepancies between the rim 38 and the wheels 46. In the preferred embodiment, for a track 32 with a width of 4.8 inches and a radius of 2.4 inches, the inner wheels 46i are separated by 2.0 inches and the outer wheels 46o are separated by 2.4 inches.

Referring to FIGS. 2-4, the shuttles 48 are coupled to a pair of cam followers 62 by a pair of shuttle clevises 64.

Each shuttle clevis 64 is connected to a shuttle 48 by a dowel pin 66. The cam followers 62 move within corresponding channels 68 of the tracks 32. The cam followers 62 and channels 68 prevent the wheel assemblies 42 from rotating about the longitudinal axis of the outer rims 38.

Each shuttle clevis 64 is connected to a chain 70 by a pair of chain links 72 and a pair of link dowel pins 74. The chains 70 are each coupled to an upper track sprocket 76 and a lower track sprocket 78.

The upper sprockets 76 are coupled to spines 80 of the tracks 32 by a pair of bolts 82. The drive assembly 24 includes a pair of upper bearings 84 that allow the upper sprockets 76 to rotate relative to the bolts 82 and the tracks 32.

The lower sprockets 78 are each mounted to a hub 86. The hubs 86 are both attached to a drive shaft 88 that extends through the frame 16. Each end of the drive shaft 88 is connected to the track spines 80 by a bolt 90, nut 92 and washer 94 assembly. The drive shaft 88 is coupled to the spine 80 by a pair of lower bearings 96. The lower bearings 96 are captured by arms 98 of the track spines 80.

One end of the drive shaft 88 has a drive sprocket 100 that is coupled to a sprocket assembly or chain drive assembly 102 by a chain 104. The sprocket assembly 102 has a hub 106 that is coupled to a track spar 108 by a bearing 110. The sprocket assembly 102 has a first sprocket 112 that is coupled to the drive sprocket 100 by the chain 104 and a second sprocket 114 that is coupled to the rear wheel 14 by chain 26. The sprocket assembly 102 may also have a third sprocket 116 that can be coupled to the chain 26 by a deraillers assembly 118.

The tracks 32 are mounted to the spar 108 by a bolt 120. The tracks 32 can be further supported by a pair of brackets 122 that are clamped to the bicycle frame 16. The brackets 122 are attached to the tracks 32 by a pair of bracket frames 124 and a plurality of bolts 126. The tracks 32 can be further secured to the spar 108 by bolts 128 which connect the spar 108 to the bracket frames 124. The spar 108 extends through the frame 16 and is held in place by a sleeve 130. The chain 104 can be maintained in tension by an idler sprocket 132 that is mounted to the track 32 by an idler arm 134.

In operation, the rider pushes down on one pedal 44 to move the wheel assembly 42 down the track 32. Movement of the wheel assembly 42 moves the chain 70 and rotates the drive shaft 88 through the rotation of lower sprocket 78. Rotation of the drive shaft 88 rotates the drive sprocket 100 and moves chain 104. Movement of the chain 104 rotates the sprocket assembly 102, which moves chain 26 and rotates the rear wheel 14.

The rotation of the drive shaft 88 also moves the lower sprocket 78 of the opposite track. The rotation of the sprocket 78 moves the chain 70 and the wheel assembly 42 so that the opposite pedal 44 moves in an upward direction. When the opposite pedal 44 moves beyond the center of the radial end portion 36, the rider pushes downward on the pedal 44 and the process is repeated. The linear portions of the tracks 32 increase the length of the pedal path that has relative parallelism between the rider's tibia and the linear power stroke path of the bike. The parallel orientation optimizes the transfer of energy from the rider to the drive assembly 24 and the rear wheel 14, thereby providing a more efficient drive assembly than chain/sprockets mechanisms of the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although a two-wheel bicycle is shown and described, it is to be understood that the drive mechanism of the present invention may be incorporated into a tricycle, quadcycle, stationary bike or any other pedal driven vehicle.

What is claimed is:

1. A bicycle drive system, comprising:
   a track which has a pair of opposing linear side portions that are joined by a pair of opposing radial end portions, wherein said linear side portions and said radial end portions define a rectilinear path;
   a wheel assembly that moves around said track;
   a pedal connected to said wheel assembly;
   a chain that is connected to said wheel assembly, said chain moves in conjunction with the movement of said wheel assembly;
   a track sprocket that is rotatably mounted relative to said track and is rotated by said chain; and
   a chain drive assembly adapted to drivingly couple said track sprocket to a rear wheel of a bicycle.

2. The system as recited in claim 1, wherein said wheel assembly has a pair of outer wheels and a pair of inner wheels.

3. The system as recited in claim 2, wherein said outer wheels are separated by a distance that is greater than a distance that separates said inner wheels.

4. The system as recited in claim 2, wherein said wheel assembly has a plurality of spherical bearings that couple a shuttle to said inner and outer wheels.

5. The system as recited in claim 1, further comprising a cam follower that is attached to said wheel assembly and which follows a channel within said track.

6. The system as recited in claim 1, further comprising a drive sprocket that is coupled to said track sprocket by a drive shaft.

7. The system as recited in claim 1, wherein said track has an outer rim which has a circular cross-section.

8. A bicycle drive system, comprising:
   a track which has a pair of opposing linear side portions that are joined by a pair of opposing radial end portions, wherein said linear side portions and said radial end portions define a rectilinear path;
   a pair of inner wheels that move about said track;
   a pair of outer wheels that move about said track, wherein said outer wheels are separated by a distance that is greater than a distance that separates said inner wheels;
   a shuttle connected to said inner and outer wheels;
   a plurality of spherical bearings that couple said inner and outer wheels to said shuttle;
   a pedal connected to said shuttle;
   a chain connected to said shuttle, said chain moves in conjunction with the movement of said inner and outer wheels; and,
   a track sprocket that is rotated by said chain.

9. The system as recited in claim 8, further comprising a cam follower that is attached to said shuttle and which follows a channel within said track.

10. The system as recited in claim 9, further comprising a drive sprocket that is coupled to said track sprocket by a drive shaft.

11. The system as recited in claim 10, wherein said track has an outer rim which has a circular cross-section.

12. A bicycle, comprising:

a frame;

a front wheel pivotally connected to said frame;

a rear wheel pivotally connected to said frame;

a pair of tracks mounted to said frame, each track having a pair of opposing linear side portions that are joined by a pair of opposing radial end portions, wherein said linear side portions and said radial end portions define a rectilinear path;

a pair of wheel assemblies that move around said tracks;

a pair of pedals connected to said wheel assemblies;

a pair of chains that are connected to said wheel assemblies, said chains move in conjunction with the movement of said wheel assemblies;

a pair of track sprockets that are rotated by said chains; and, a chain drive assembly that couples said track sprockets to said rear wheel.

13. The system as recited in claim 12, wherein said wheel assemblies each have a pair of outer wheels and a pair of inner wheels.

14. The system as recited in claim 13, wherein said outer wheels are separated by a distance that is greater than a distance that separates said inner wheels.

15. The system as recited in claim 13, wherein said wheel assemblies have a plurality of spherical bearings that couple a pair of shuttles to said inner and outer wheels.

16. The system as recited in claim 13, further comprising a pair of cam followers that are attached to said wheel assemblies and which follow a pair of channels within said tracks.

17. The system as recited in claim 13, wherein said tracks each have an outer rim which has a circular cross-section.

* * * * *